April 12, 1960 — E. M. PHILLIPS — 2,932,200
METERING DEVICE FOR USE IN CONNECTION WITH MILKING MACHINERY
Filed May 13, 1957 — 3 Sheets-Sheet 1

Inventor
Evan M. Phillips

April 12, 1960 E. M. PHILLIPS 2,932,200
METERING DEVICE FOR USE IN CONNECTION
WITH MILKING MACHINERY
Filed May 13, 1957 3 Sheets-Sheet 2

Inventor
Evan M. Phillips
By
Watson Cole Grindle + Watson
Attys.

Inventor
Evan M. Phillips
By Watson, Cole, Grindle, Watson
Attys.

United States Patent Office 2,932,200
Patented Apr. 12, 1960

2,932,200

METERING DEVICE FOR USE IN CONNECTION WITH MILKING MACHINERY

Evan M. Phillips, Te Rapa, Hamilton, New Zealand

Application May 13, 1957, Serial No. 658,638

3 Claims. (Cl. 73—392)

This invention relates to a metering device for use in indicating or recording a condition in part of a milikng machine installation, such as the ratio of vacuum to air in connection with the pulsations of the milking machine teat cups, or such as to measure and indicate the rate of pulsation of a pulsator whereby the number of complete strokes per minute are given.

In order to clarify the following description it is here mentioned that pulsation ratio is the ratio between the time the vacuum is on and the time the air is on, and pulsation rate is the number of alternations per minute of the pulsator valve from air to vacuum and back to air.

The invention, following a basic principle that air will enter and leave a chamber through a given orifice under a fixed pressure always at the same rate, has several applications. One is where the pressure is derived by air being let in and out in an unknown ratio of pulsations at any given number of times per minute, so that a gauge reading is allowed to waver freely and thus indicate a mean vacuum in the chamber which is proportional to the ratio of air pulsations. Another application is where the fixed pressure is derived from air being let in and out in equal proportions (50:50) an unknown number of times per minute so that a gauge reading is held at a peak reading to indicate the peak vacuum in the chamber to be proportional to strokes per minute, i.e. rate.

According to one aspect, the invention includes a metering device for use in indicating the ratio of vacuum to air impulses in a pulsation line of a milking machine installation, the device having a connection for the temporary interposing in the pulsation line, a resistance orifice mounted for the connection to be in communication with a first chamber, a second chamber in communication through a second resistance orifice with the first chamber and a gauge in communication with the second chamber with a dial of the gauge calibrated to indicate the pulsation ratio, i.e. the vacuum to air impulses conveyed from the said line.

Further, the invention includes a metering device for use in measuring and indicating the rate of impulses in a pulsation line of a milking machine installation, the device having a connection for interposing in the pulsation line, a resistance orifice mounted for the connection to be in communication with a first chamber, a second chamber in communication with the first chamber by means of a one-way valve, and a gauge in communication with the second chamber with a dial of the gauge calibrated to indicate the pulsation rate, i.e. the impulses conveyed from the said line.

Also, the invention provides that, by including a two-way tap in a bye-pass between the second orifice and the one-way valve and marking the device with calibrations for ratio and for rate, the device may be adapted for either use.

Thus, in the case of the ratio measurement, the two chambers will govern the impulses of vacuum by a two-stage damping, and, in the case of the rate measurement, the second chamber with the one-way valve in place of the second orifice will act as a peak retaining means.

In further describing the invention reference will be made hereinafter to the accompanying drawings, in which.

Figure 1:
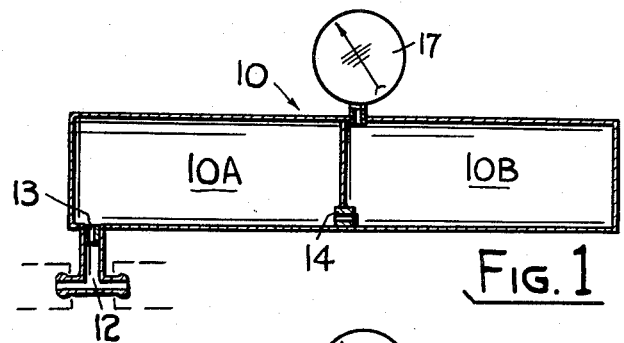
Figure 1 is a diagram of the device with the two orifices.
Figure 2:
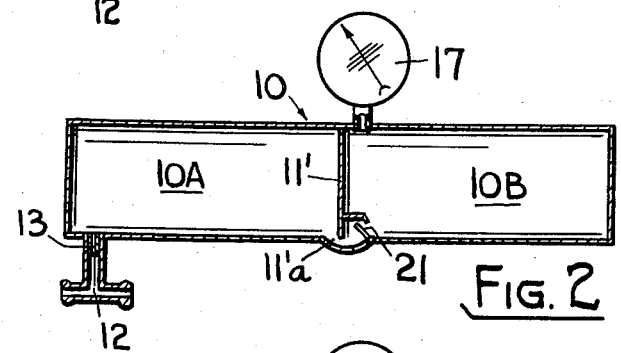
Figure 2 is a diagram of the device with the single orifice and the one-way valve.
Figure 3:
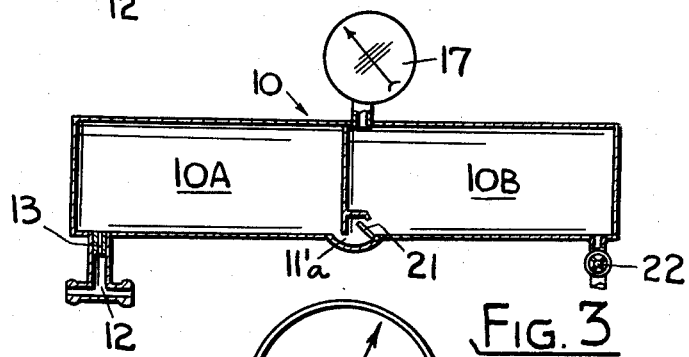
Figure 3 is a diagram of the device as shown in Figure 2 and with a one-way tap.

As generally illustrated in the drawings, the device is constructed with a small cylinder 10 divided into two separate chambers 10A, 10B, of substantially similar size, which chambers are in line or endwise, by a wall 11' of a central bracket or boss 11. The connection 12 of the device is attached to the first chamber 10A and the first resistance orifice can be in the nature of a plug 13 inserted into this connection. The second resistance orifice can be a plug 14 set in the central wall 11' so that both chambers are in communication. The orifices of the plugs 13 and 14 are of a fixed size in proportion to the capacity of both chambers 10A, 10B.

Figure 4:
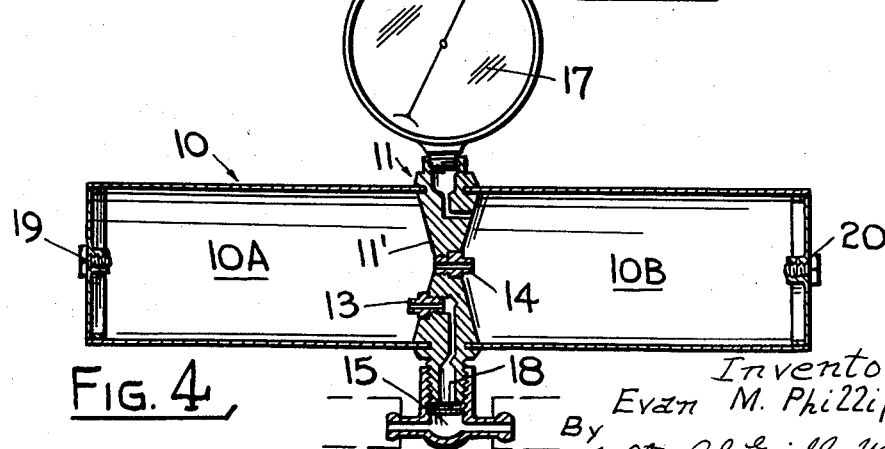
Figure 4 is a sectional view of the device similar to Figure 1 but with the two orifices mounted in a central boss or bracket.
Figure 6:
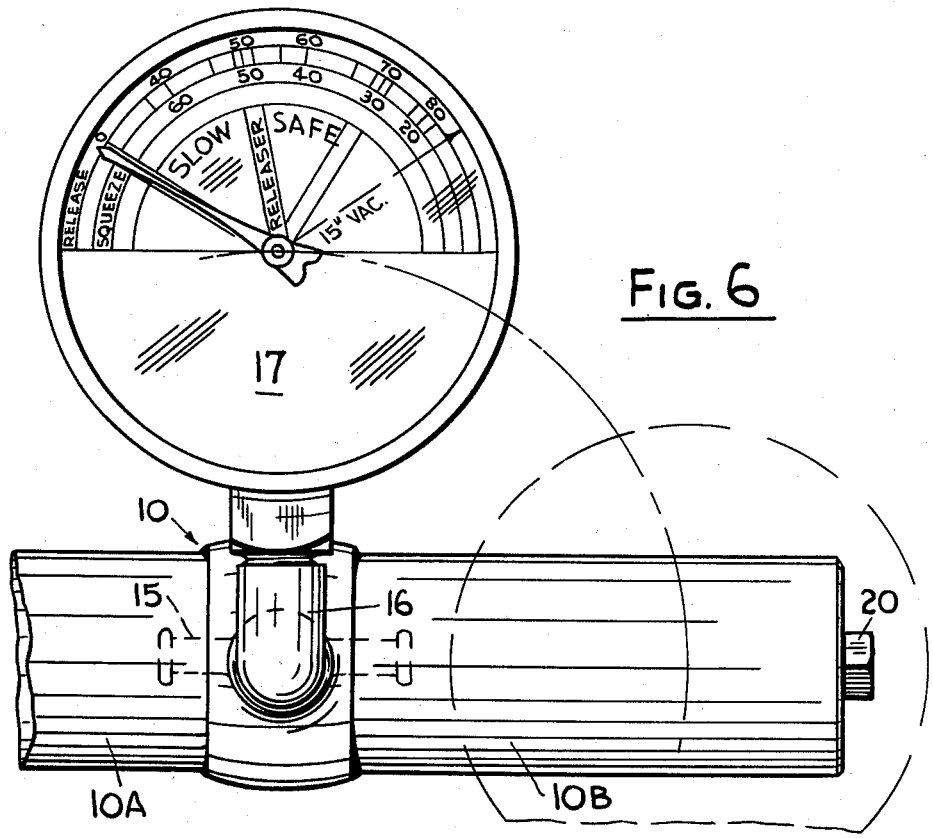
Figure 6 is a front view of a form of the device showing only a portion of the first chamber.
Figure 7:
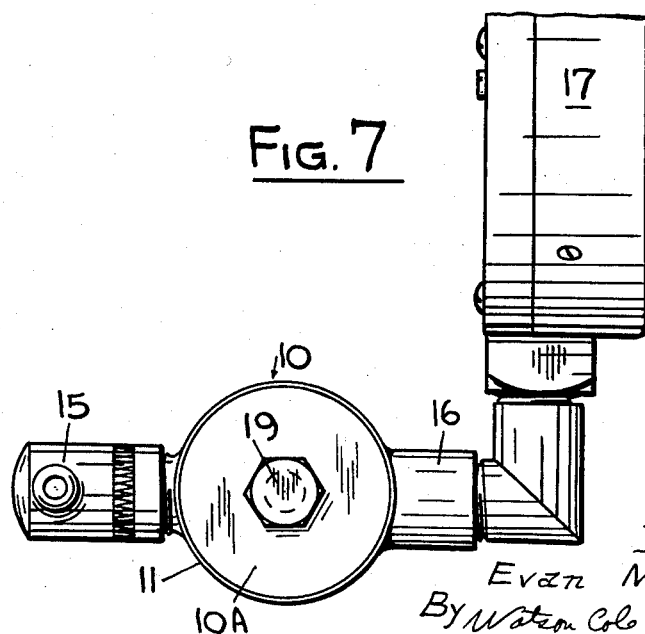
Figure 7 is an end view of such device.

As shown in drawings, Figures 4, 6 and 7, the connection can be as a by-pass fitting 15 mounted in the central boss 11 having an adapter 16 to which is fitted hingedly a gauge 17 with its dial specially calibrated to read in pressure ratio. This dial can be calibrated by the use of a vacuum recording unit as, for instance, disclosed in New Zealand patent specification No. 112,486, the ratio indicated by the stylus thereof moving on travelling paper on the dial under test, so that any tendency to produce dissimilar ratio on the dial is impossible; the calibrations are made against pulsators of known ratio which have been assembled and sealed down.

A filter 18 of felt washers can be inserted in the connection 12 or the bye-pass fitting 15, to prevent entry of dust particles larger than the orifices of the plugs 13 and 14, or cumulative fouling, and two small screw plugs 19, 20, are situated in the centre of the outer extremities of the chambers 10A, 10B, to allow moisture to be drained out if such enters.

The by-pass fitting 15 is adapted to be inserted in the air-line between the teat cup claw and the teat cup itself so that no restrictions are placed on the pulsations to the cup. The arrangement of the various parts of the device is thus such that air under pulsations may enter from the air-line to the cup, passing through the connection and its filter (if included), then through the first resistance orifice 13 into the first chamber 10A, from which it is in turn passed through the second resistance orifice 14 into the second chamber 10B and actuated on the gauge 17 of this chamber.

In this application of the invention to pulsation ratio, the pulsating vacuum at the teat cup thus affects the chambers 10A, 10B, in the device via the interposed orifices 13 and 14 so as to give a two-stage damping effect to the vacuum and air pulses at the input connection 12 or 15 thus smoothing it to a "mean" which is then indicated on the gauge 17. This is effected by air being withdrawn from the connection 12 or 15, partially evacuating the first chamber 10A through the orifice 13. Air then travels from the second chamber 10B through the orifice 14 into the first chamber 10A, the change registering a reading on the dial of the gauge 17. Now, as air is withdrawn and admitted to the first chamber, the pressure in such chamber fluctuates, and so does air pressure in the second chamber but to a lesser degree. Now the gauge needle will come to a slightly wavering stop as the optimum pressure in the second chamber is reached, and the gauge 17 will then read the ratio of air admitted and the air withdrawn from the first chamber. So that the first chamber 10A and its orifice 13 cause the alternate vacuum and air impulses to seek a mean which is still slightly fluctuating, the second chamber 10B and its orifice 14 causes this still slightly fluctuating mean to be smoothed still further to a mean, this final mean giving the very slight movement, about 1/16 inch, to the needle of a standard vacuum gauge dial. This is necessary to keep the gauge "alive" to fluctuations in the pressure and so give accurate readings quickly. Alternately, the final mean can be indicated and represented on graphed paper of the vacuum recording unit by an almost straight line. The readings on the calibrated dial of the gauge are presented directly as a ratio and can be classified in relation to the milking machine's efficiency by a skilled observer so that adjustment can be readily made.

In the other application of the invention the device includes a one-way valve 21 in place of the second orifice 14. The wall 11' of the central boss 11 has a bye-passage 11'a, and the one-way valve 21 is as a flap valve located to close or open the bye-passage 11'a by pressure in the second chamber 10B.

The gauge 17 mounted in this boss and connected with this second chamber has its dial calibrated to indicate readings of strokes per minute.

The second chamber 10B has a controlled air inlet by means of a one-way tap 22 for equalising air pressure in this chamber to atmospheric pressure after use.

This application of the device is specially designed to measure the pulsation rate in the actuating line of a pneumatically operated milking machine or any suitable 50:50 pulsator.

In this use, the connection fitting 12 or 15 is connected with the pulsation line and, on operation, air is started to be withdrawn from the first chamber 10A through the orifice 13 and the connection fitting. Then the pulsator switches to its air stroke and begins to admit air again to the first chamber. This alternating action of air and vacuum causes a fluctuating pressure in the first chamber 10A, the chamber never being wholly evacuated or right down to air pressure because of the restricting or resistance effect of the orifice 13.

However, as the vacuum rises in this first chamber 10A, air will pass from the second chamber 10B via the one-way valve 21 into the first chamber 10A, but this valve will prevent air getting back from the chamber 10A. After a few pulsations the vacuum in the second chamber 10B will correspond to the peak vacuum attained in the first chamber. This peak vacuum is in proportion to the number of times per minute the 50:50 pulsator oscillates from air to vacuum.

It will be appreciated here that, if the pulsator rate was slower, the first chamber 10A would have longer to be evacuated in and thus the vacuum attained would be higher, and vice versa—if the pulsation rate was faster the first chamber 10A would have less time in which to be evacuated, and thus the peak vacuum would be correspondingly low.

Reading of the dial gauge, calibrated in strokes per minute, can be taken directly. Upon optimum reading being obtained the device is disconnected from the pulsator under test and, before being attached to another to be tested, the air control tap 22 is turned on for a short time to equalise the second chamber 10B to atmospheric pressure, and then the tap is closed again.

Either type of the device above described can be built as a small compact unit that may easily be handled as, for instance, by dairy farmers, without great risk of damage thereto and which will not interfere with normal operations of the milking machine. It is also possible to include both applications of the device in a control panel so that one gauge dial would give pulsation ratio and another gauge dial would indicate pulsation rate. The panel could also include dials for reading off reserve air, which would be measured by a variation of an airflow meter so that the amount of air flowing may be measured, a vacuum gauge for reading off vacuum level and a time clock for making comparisons between readings.

Figure 5:
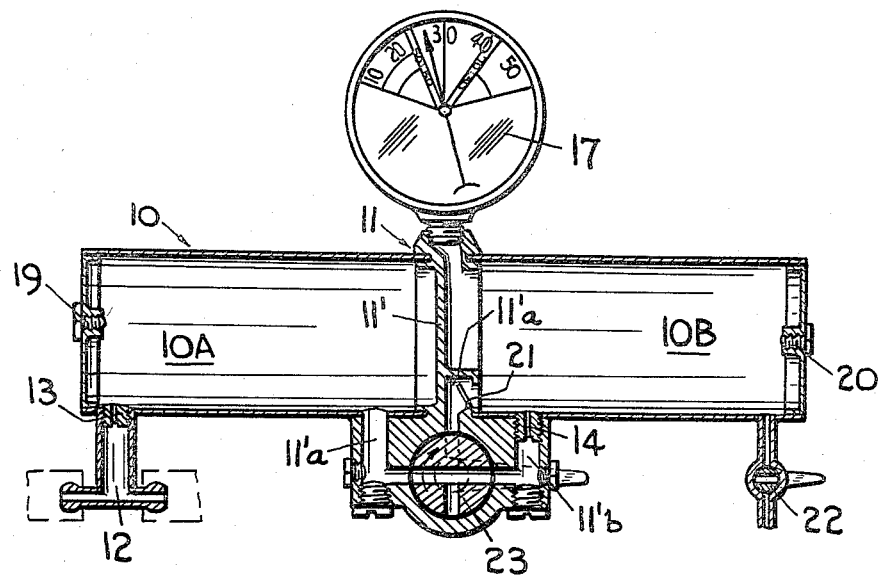
Figure 5 is a sectional view of the device similar to Figure 3 but with a two-way tap and the second orifice.

Also in the invention and by a suitable modification, the two types of the device can be incorporated into one unit. As shown in Figure 5, this is provided for by including a two-way tap 23 and a further passage 11'b passing directly therefrom to the second chamber. In this further passage the second orifice plug 14 can be inserted. In Figure 5 the tap 23 is set for the device to function to indicate pulsation ratio and, when the tap is turned clockwise a quarter of a turn, the device is set for pulsation rate reading. In this type of combined unit the dial is calibrated with both markings.

When the device is used again for one or the other purpose the air control tap 22 is opened to admit air and then closed again, when the device is again ready for use either as a ratio or rate meter according to where the two-way tap 23 is set.

The device may also be inserted at one of the points in the air-line of the milking machine installation and at the releaser (this is included in the gauge dial in drawing Figure 6) to check the pulsation ratio at any desired point.

Having now described my invention, what I claim is:

1. A metering device for use in indicating the ratio of vacuum to air impulses in a pulsation line of a milking machine installation, the device having a connection for temporary attachment to the pulsation line, a cylinder divided into two chambers by a central boss, a resistance orifice mounted in the boss for the connection to be in communication with one of the chambers, a second resistance orifice mounted in the boss for the chambers to be in communication, and a gauge in communication with the other chamber with a dial calibrated to indicate the pulsation ratio, i.e. the vacuum to air impulses conveyed from the said line.

2. A metering device according to claim 1, in which the connection and the gauge are mounted in the central boss.

3. A metering device for use in indicating the ratio of vacuum to air impulses in a pulsation line of a milking machine installation, the device having a connection for temporary attachment to the pulsation line, a cylinder divided into two chambers of substantially similar size by a central boss, a resistance orifice mounted for the connection to be in communication with one of the chambers, a second resistance orifice mounted in the boss communicating the chambers, and a gauge in communication with the other chamber with a dial calibrated to indicate the pulsation ratio, i.e. the vacuum to air impulses conveyed from the said line.

References Cited in the file of this patent

UNITED STATES PATENTS

| 1,181,566 | Bowden | May 2, 1916 |
| 1,424,461 | Frankforter | Aug. 1, 1922 |
| 1,697,344 | Campbell | Jan. 1, 1929 |
| 2,217,564 | Scriba | Oct. 8, 1940 |
| 2,486,133 | Egger | Oct. 25, 1949 |
| 2,693,112 | Beck | Nov. 2, 1954 |

FOREIGN PATENTS

| 812,847 | Germany | Sept. 6, 1951 |